US008417743B2

(12) United States Patent
Kameda et al.

(10) Patent No.: US 8,417,743 B2
(45) Date of Patent: Apr. 9, 2013

(54) DATA MANAGEMENT APPARATUS, DATA MANAGEMENT PROGRAM AND DATA MANAGEMENT SYSTEM

(75) Inventors: Nobuya Kameda, Kariya (JP); Yousuke Satou, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/931,370

(22) Filed: Jan. 31, 2011

(65) Prior Publication Data

US 2011/0191392 A1 Aug. 4, 2011

(30) Foreign Application Priority Data

Feb. 1, 2010 (JP) ................................. 2010-020304
Dec. 8, 2010 (JP) ................................. 2010-273852

(51) Int. Cl.
*G06F 17/30* (2006.01)

(52) U.S. Cl.
USPC .......................................................... 707/812

(58) Field of Classification Search ........................ None
See application file for complete search history.

(56) References Cited

U.S. PATENT DOCUMENTS

| | | | | | |
|---|---|---|---|---|---|
| 5,948,026 | A * | 9/1999 | Beemer et al. | ............... | 701/33.4 |
| 7,117,075 | B1 * | 10/2006 | Larschan et al. | ............. | 701/29.6 |
| 2007/0050126 | A1 * | 3/2007 | Nou | ............................. | 701/117 |
| 2007/0083304 | A1 * | 4/2007 | Yamada | .......................... | 701/29 |
| 2007/0189295 | A1 * | 8/2007 | Hamamoto et al. | .......... | 370/392 |
| 2008/0262670 | A1 * | 10/2008 | McClellan et al. | ............. | 701/29 |

FOREIGN PATENT DOCUMENTS

JP 2008-022158 1/2008

* cited by examiner

*Primary Examiner* — Yuk Ting Choi
(74) *Attorney, Agent, or Firm* — Harness, Dickey & Pierce, PLC

(57) ABSTRACT

In an apparatus for managing data processed in a vehicle, from outside the vehicle, acquired is a management rule including at least one of information indicating types of data to be acquired by an external device placed outside the vehicle and information indicating an acquisition cycle at which the data should be acquired. At least one of the type of data and the acquisition cycle is set by making reference to the management rule in response to acquisition of the management rule. Data is acquired, which is according to at least of one of the type of data and the acquisition cycle. The acquired data is stored in a data recorder.

12 Claims, 12 Drawing Sheets

FIG.3A

```
MANAGEMENT RULE ID        /* MANAGEMENT RULE ID */
UPDATE TIME AND DATE      /* UPDATE TIME AND DATE OF MANAGEMENT RULE */
VEHICLE ID                /* ID OF VEHICLE DATA MANAGEMENT ECU */
EXTERNAL DEVICE ID        /* EXTERNAL DEVICE ID */
APPLICATION ID            /* ID OF AP ACTIVATED ON EXTERNAL DEVICE */

# TO-BE-ACQUIRED DATA 1
·DATA ID                  /* ID OF TO-BE-ACQUIRED DATA */
·ACQUISITION CYCLE        /* DATA ACQUISITION CYCLE */
·ACQUISITION METHOD       /* CHOOSE UPDATE OR STORE */
·ACQUISITION RANGE        /* SPECIFY TIME OR NUMBER OF RECORDS */

# TO-BE-ACQUIRED DATA 2
·DATA ID
·ACQUISITION CYCLE
·ACQUISITION METHOD
```

FIG.3B

| DATA ID | ACQUISITION CYCLE [ms] | ACQUISITION METHOD | ACQUISITION RANGE |
|---|---|---|---|
| 0×0001 | 100 | STORE | 5 |
| 0×0002 | 32 | UPDATE | 1 |
| | | | |

| DATA ID | DATA ID MANAGED BY THE GATEWAY CONCERNED |
|---|---|
| 0×0001 | 0×1A |
| 0×0002 | — |
| 0×0003 | 0×13 |
| 0×0004 | — |
| | |

DATA MANAGEMENT APPARATUS, DATA MANAGEMENT PROGRAM AND DATA MANAGEMENT SYSTEM

CROSS-REFERENCE TO RELATED APPLICATION

This application is based on and claims the benefit of priority from earlier Japanese Patent Application Nos. 2010-020304 and 2010-273852 filed Feb. 1, 2010 and Dec. 8, 2010, respectively, the descriptions of which are incorporated herein by reference.

BACKGROUND OF THE INVENTION

1. Technical Field of the Invention

The present invention relates to a data management apparatus that manages data in a vehicle, a data management program and a data management system.

2. Related Art

Data management apparatus have been known as disclosed in JP-A-2008-022158, for example. Such a data management apparatus has a function of recording given type-specific data and transmitting the recorded data to a device outside the vehicle (external device).

Information required by an external device may change with the change, for example, of an application possessed by the external device. The information may include types of data and update frequency. However, the data management apparatus as mentioned above has not been able to cope with such information change and therefore has suffered from a problem of limited capability of recording data at only the same types and of the same cycles.

SUMMARY OF THE INVENTION

The present invention has been made in light of the problem set forth above and has an object of enabling change of data management mode in a vehicle in response to the change of information required by a device external of the vehicle (external device), in a data management apparatus.

In order to achieve the above object, as one aspect of the present invention, there is provided an apparatus for managing data processed in a vehicle, comprising: rule acquiring means for acquiring, from outside the vehicle, a management rule including at least one of information indicating a type of data to be acquired by an external device placed outside the vehicle and information indicating an acquisition cycle at which the data should be acquired; rule setting means for setting, in the management apparatus, at least one of the type of data and the acquisition cycle by making reference to the management rule in response to acquisition by the rule acquiring means; data acquiring means for acquiring data which is according to at least of one of the type of data and the acquisition cycle set by the setting means; a data recorder; and data storing means for storing in the data recorder the data acquired by data acquiring means.

Thus, the data management apparatus is able to change data management mode (at least either one of the information on types of data (hereinafter also referred to as "data types") of the data to be acquired and the information on the cycles of the data to be acquired (hereinafter also revered to as "data acquisition cycles")) to be recorded on the data recorder, according to the data management mode included in the management rule acquired from outside the vehicle. Accordingly, when the information required by a device outside the vehicle (hereinafter also referred to as "external device") has been changed, the corresponding data required by the external device can be recorded inside the vehicle.

The data to be recorded inside the vehicle includes data acquired by sensors installed in the vehicle to control the vehicle while traveling (water temperature, vehicle speed, fuel injection quantity, etc.), data associated with the environment around the vehicle (outside air temperature, road surface conditions, traffic density, etc.), or data on the vehicle driver's operation (accelerator position, switch operations, etc.).

It is preferred that the apparatus is communicably connected to a gateway via a communication line, the gateway operating on changeable relay states, the management rule includes the information indicating the type of data to be acquired, and the rule setting means is adapted to set the type of data to be acquired, by making reference to the management rule, the apparatus comprising relay state setting means for allowing the gateway to be set such that the gateway relays, from the external device, the data whose type is set by the rule setting means.

Thus, according to the data management apparatus, the gateway, even when it is provided on the on-vehicle network, can be set so that type-specific data required by the data management apparatus can be relayed by the gateway.

It is also preferred that the management rule also includes the information indicating the acquisition cycle, and the rule setting means is adapted to also set the acquisition cycle by making reference to the management rule, the relay state setting means is adapted to allow the gateway to be set such that the gateway relays, from the external device, the data at the accusation cycle set by the rule setting means, the data having the type set by the rule setting means. Thus, according to the data management apparatus, the data acquisition cycles are also set at the gateway.

The communication line may be a dedicated communication line for data, wherein the dedicated communication line is connected to only the gateway. Thus, according to the data management apparatus, the data genres and data acquisition cycles of the data to be acquired by the data management apparatus are managed by the gateway. Accordingly, the data management apparatus is not required to have a function of sorting data and therefore the configuration of the data management apparatus is simplified.

In addition to the above advantages, various other advantages will be understood from the following disclosure which is explained in association with the drawings. Such additional advantages can be exemplified as follows.

According to the data management apparatus, the number of pieces of data to be stored in the data recording means is set/changed for each of data genres to be stored, by only acquiring the management rule. In particular, the present invention is significant in that storage capacity is saved in a vehicle having strict limitations on the capacity of memories, such as the data recording means.

According to the data management apparatus, the change based on the management rule is prevented from being made while the vehicle installed with the data management apparatus (hereinafter also referred to as "the vehicle concerned" or just as "the vehicle") is in travel. Accordingly, control of the vehicle concerned in travel is prevented from being affected by the change of the data management mode.

According to the data management apparatus, the action inhibited when the vehicle has been stopped can be resumed. Therefore, the management rule acquired from outside the vehicle is prevented from being ignored.

According to the data management apparatus, data can be continuously stored using the saved management data before being changed, under the condition where the updating processing of the management data is inhibited by the inhibiting means.

According to the data management apparatus, the data requested by the external device can be transmitted to the external device.

As another aspect of the present invention, there is provided a program implemented in an apparatus for managing data processed in a vehicle, the program being readably stored in medium by a computer, wherein the program allows the computer to functionally work as: rule acquiring means for acquiring, from outside the vehicle, a management rule including at least one of information indicating a type of data to be acquired by an external device placed outside the vehicle and information indicating an acquisition cycle at which the data should be acquired; rule setting means for setting at least one of the type of data and the acquisition cycle by making reference to the management rule in response to acquisition by the rule acquiring means; data acquiring means for acquiring data which is according to at least of one of the type of data and the acquisition cycle set by the setting means; and data storing means for storing in a data recorder the data acquired by data acquiring means.

As a further aspect of the present invention, there is also provided a system comprising a data management apparatus for managing data processed in a vehicle having an on-vehicle network and a gateway communicably connected to the data management apparatus via a communication line, wherein the data management apparatus comprises: rule acquiring means for acquiring, from outside the vehicle, a management rule including at least one of information indicating a type of data to be acquired by an external device placed outside the vehicle and information indicating an acquisition cycle at which the data should be acquired; management data transmitting means for transmitting to the gateway management data indicating at least one of the information indicating the type of data to be acquired or the information indicating the acquisition cycle of the data; data storing means for acquiring data from the gateway and storing the acquired data in a data recorder, and wherein the gateway is communicably connected to the on-vehicle network, and the gate way comprises: means for acquiring the management data from the data management apparatus; type/cycle setting means for setting at least one of the type of data to be acquired and the acquisition cycle of the data by making reference to the management data; means for acquiring from the on-vehicle network the data whose type is set by the type/cycle setting means or acquiring from the on-vehicle network the data of a predetermined type at the cycle set by the type/cycle setting means; and relay executing means for relaying the acquired data to the data management apparatus.

Thus, according to the data management system, data management mode (at least either one of the information on data types of the data to be acquired and the information on data acquisition cycles of the data to be acquired) to be recorded on the data recorder can be changed, according to the data management mode included in the management rule acquired from outside the vehicle. Accordingly, when the information required by the external device has been changed, the corresponding data required by the external device can be recorded inside the vehicle. It should be appreciated that the management rule may be completely the same as the management data.

Other features and advantages gained in the present invention will be described in the following disclosure which should be interpreted together with the accompanying drawings.

BRIEF DESCRIPTION OF THE DRAWINGS

In the accompanying drawings:

FIGS. 3A and 3B are explanatory diagrams illustrating the contents of a management rule used in the system;

DETAILED DESCRIPTION OF THE PREFERRED EMBODIMENTS

With reference to the accompanying drawings, hereinafter is described an embodiment of the present invention.

Figure 1:
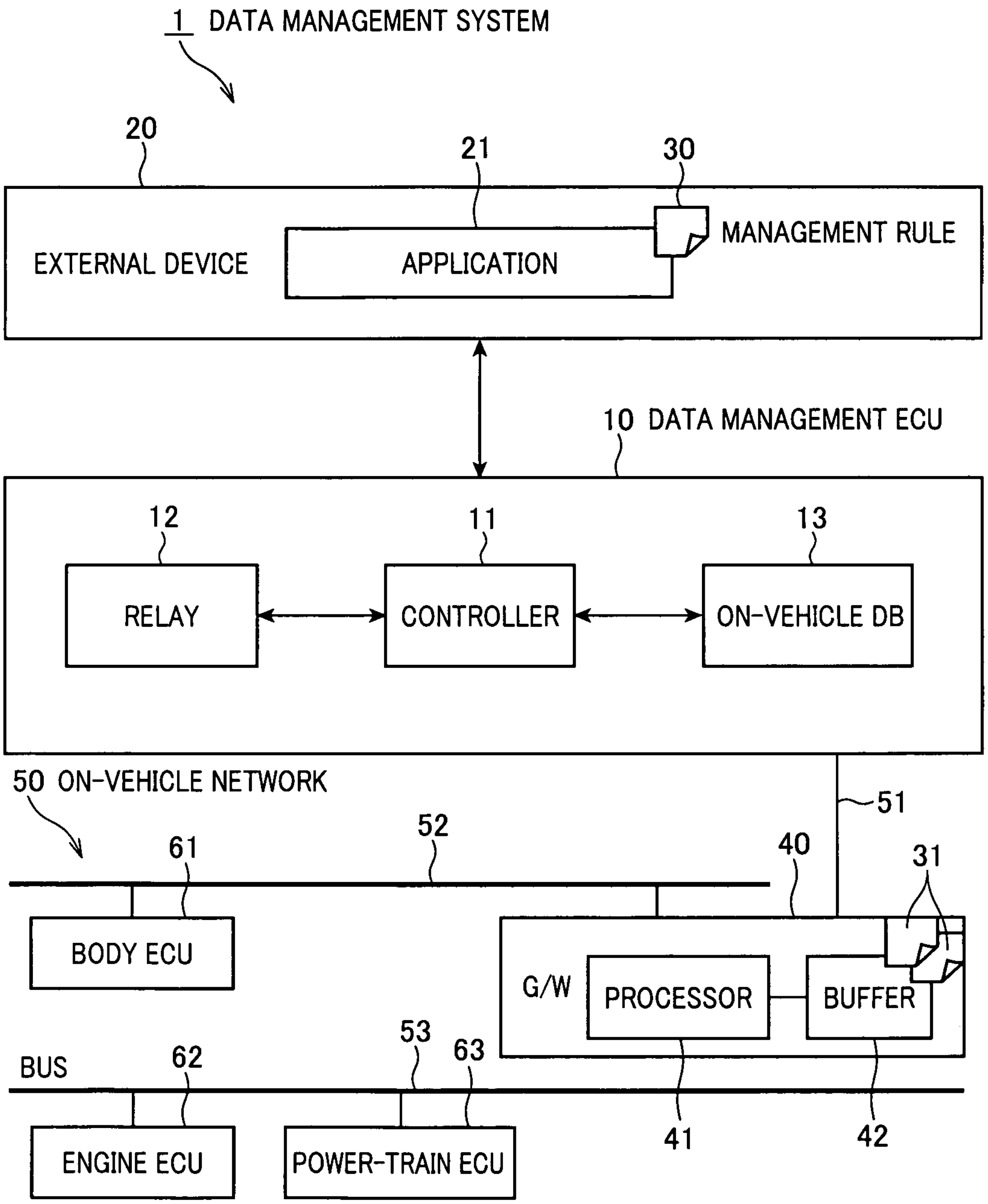
FIG. 1 is a schematic block diagram illustrating a configuration of a data management system according to an embodiment of the present invention.

FIG. 1 is a schematic block diagram illustrating a configuration of a data management system 1 according to an embodiment of the present invention. As shown in FIG. 1, the data management system 1 includes a data management ECU (electronic control unit) 10 (data management apparatus) installed in a vehicle, such as a passenger car, an on-vehicle network 50 and an external device 20, such as a mobile phone, that is a device provided external to the vehicle (hereinafter just referred to as "external device 20").

In the data management system 1, the data management ECU 10 is connected to the on-vehicle network 50. The data management ECU 10 has a function of acquiring given data from the on-vehicle network 50 and retaining the data in the data management ECU 10 per se. Meanwhile, the data management ECU 10 is also configured so as to be able to communicate with the external device 20. Specifically, the data management ECU 10 is configured so as to be able to change the types of data (hereinafter also referred to as "data types") and the cycles of acquiring the data from the on-vehicle network 50 (hereinafter also referred to as "data acquisition cycles"), according to the instructions from the external device 20.

The configuration will now be specifically described. The data management ECU 10 is configured as an electronic control unit, for example, for managing information associated with entertainment and the like, and includes a controller 11, a relay 12 and an on-vehicle DB (data base) 13 (data recorder).

The controller 11 is configured as a known microcomputer that includes CPU, ROM and RAM. The controller 11 performs such processes as an entry relaying process (FIG. 4), an entry holding process (FIG. 6B) and an information transmitting process (FIG. 9), which will be described later, based such as on a program stored in the ROM. For example, the controller 11 performs a process of acquiring type-specific data from the on-vehicle network 50, the type-specific data being determined based on a management rule 30 recorded in the on-vehicle DB 13, and storing the acquired type-specific data in the on-vehicle DB 13.

The relay 12 is configured as a known communication module that relays a communication between the data management ECU 10 and the external device 20 or between the data management ECU 10 and the on-vehicle network 50, in response to an instruction from the controller 11. The relay 12 has a function of retaining data to be transmitted outside, in response to an interruption instruction from the controller 11 and then transmitting the retained data in response to a resumption instruction from the controller 11.

The on-vehicle DB 13 is configured as recording means, such as hard disc or flash memory. In particular, the on-vehicle DB 13 of the present embodiment is used for storing the management rule 30 transmitted from the external device 20 and various pieces of data received from the on-vehicle network 50. The various pieces data include vehicle information associated with the travel of the vehicle equipped with the data management system 1 (hereinafter referred to as "the vehicle concerned" or just as "the vehicle"), such as vehicle speed, travel distance, fuel consumption and an actual location, and personal information associated with the driver and other occupants, such as age, sex and preferences.

The on-vehicle network 50 includes, for example, a body ECU 60 connected to a body-system communication line 52, and an engine ECU 62 and a power-train ECU 63 connected to a control-system communication line 53. These ECUs are configured so as to be mutually communicable via a gateway (G/W) 40.

The data management ECU 10 is not directly connected to the body-system communication line 52 or the control-system communication line 53 but is connected to the gateway 40 alone via a dedicated communication line 51. The gateway 40 includes a processor 41 and a buffer 42. The processor 41 is configured as a know microcomputer that includes CPU, ROM and RAM. The buffer 42 records data, such as management data 31, which will be described later.

The processor 41 of the gateway 40 has a function of relaying data between the body-system communication line 52 and the control-system communication line 53 based such as on a program stored in the ROM of the processor 41. The processor 41 also has a function of relaying data between these communication lines 52 and 53 and the data management ECU 10.

The external device 20 is provided with a microcomputer that includes CPU, ROM, and RAM. The microcomputer is operated with a generally used operation system. The external device 20 is configured as a terminal unit, such as a mobile phone or a portable computer, which is able to communicate with the data management ECU 10.

The external device 20 includes an application 21 which provides such services as ecological driving diagnosis and digital signage. In the ecological driving diagnosis, various pieces of data are collected from the vehicle (data management ECU 10) for use in diagnosing whether or not fuel-efficient driving is performed by the driver. In the digital signage, the personal information is utilized.

The communication via the dedicated communication line 51 is performed using On-Vehicle Ethernet™. The communication via the body-system communication line 52 and the control-system communication line 53 is performed using the well-known CAN (controller-area network) protocol. The communication between the external device 20 and the data management ECU 10 may make use of such a communication technique as serial communication with which communication is made at lower speed than with On-Vehicle Ethernet™ or CAN.

The data management system 1 is able to perform a process of setting/changing the type and the recording cycle of each piece of data recorded in the data management ECU 10, in response to the instructions from the external device 20. Referring to FIGS. 2, 4, 5, 6A and 6B, this process will now be specifically described.

Figure 2:
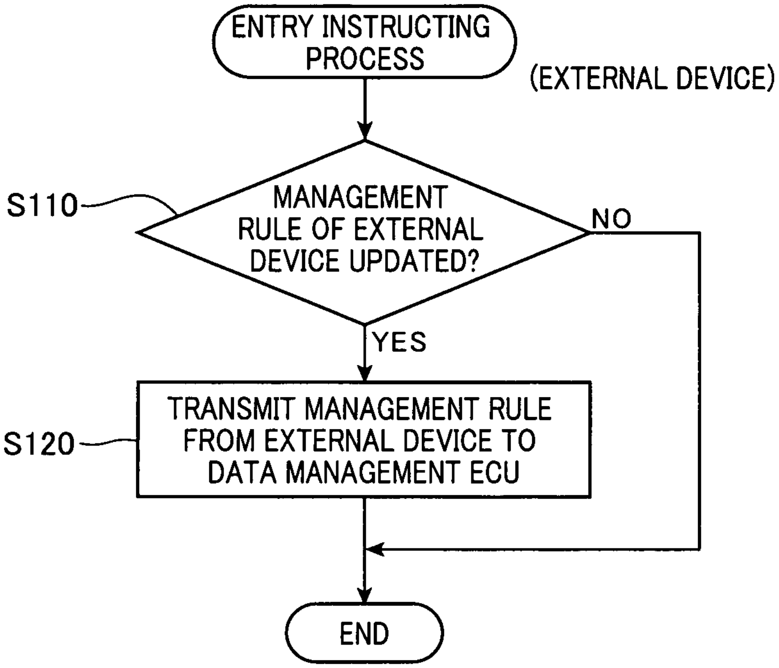
FIG. 2 is a flow diagram illustrating an entry instructing process performed in the system.
Figure 4:
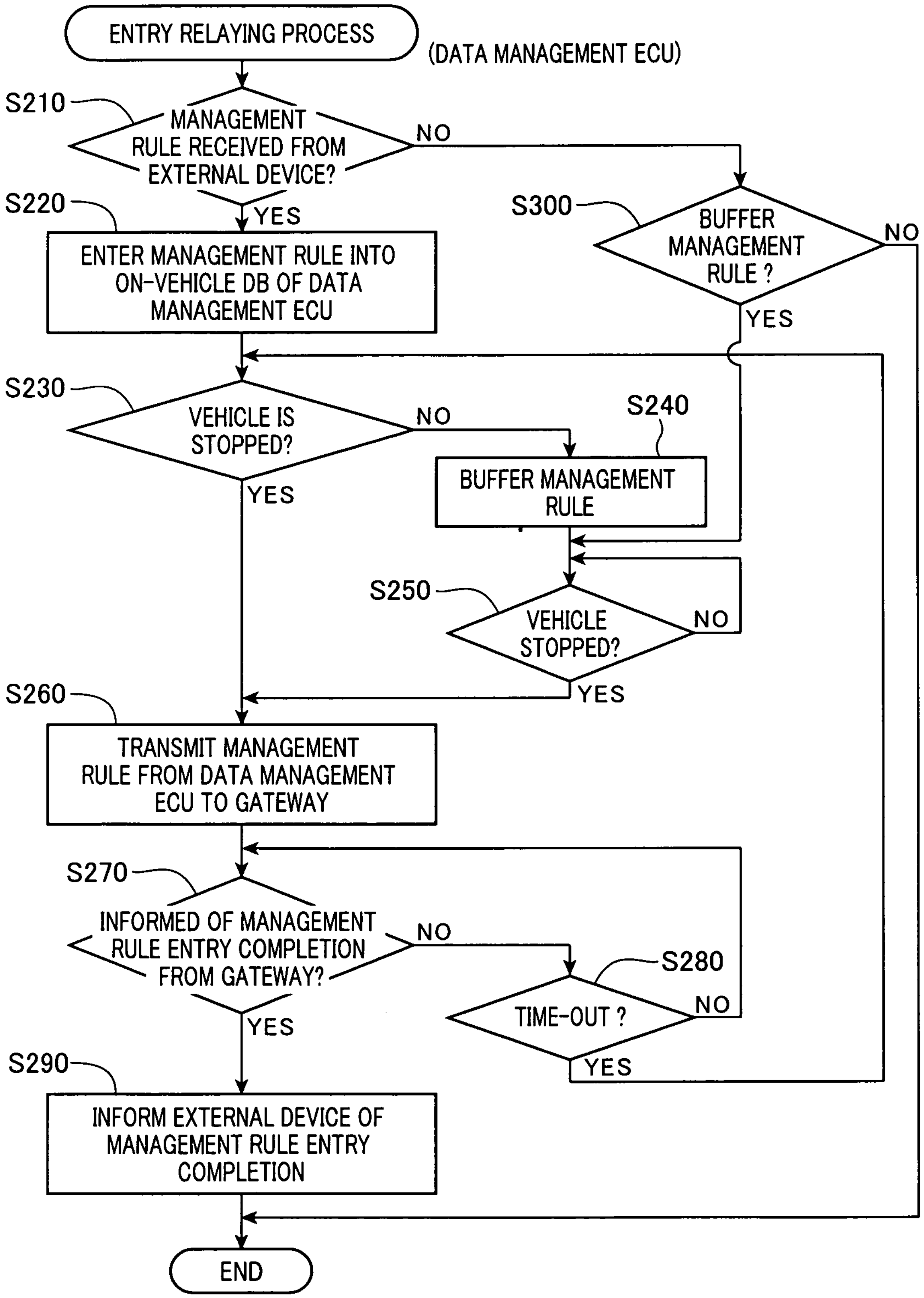
FIG. 4 is a flow diagram illustrating an entry relaying process performed in the system.
Figure 5:
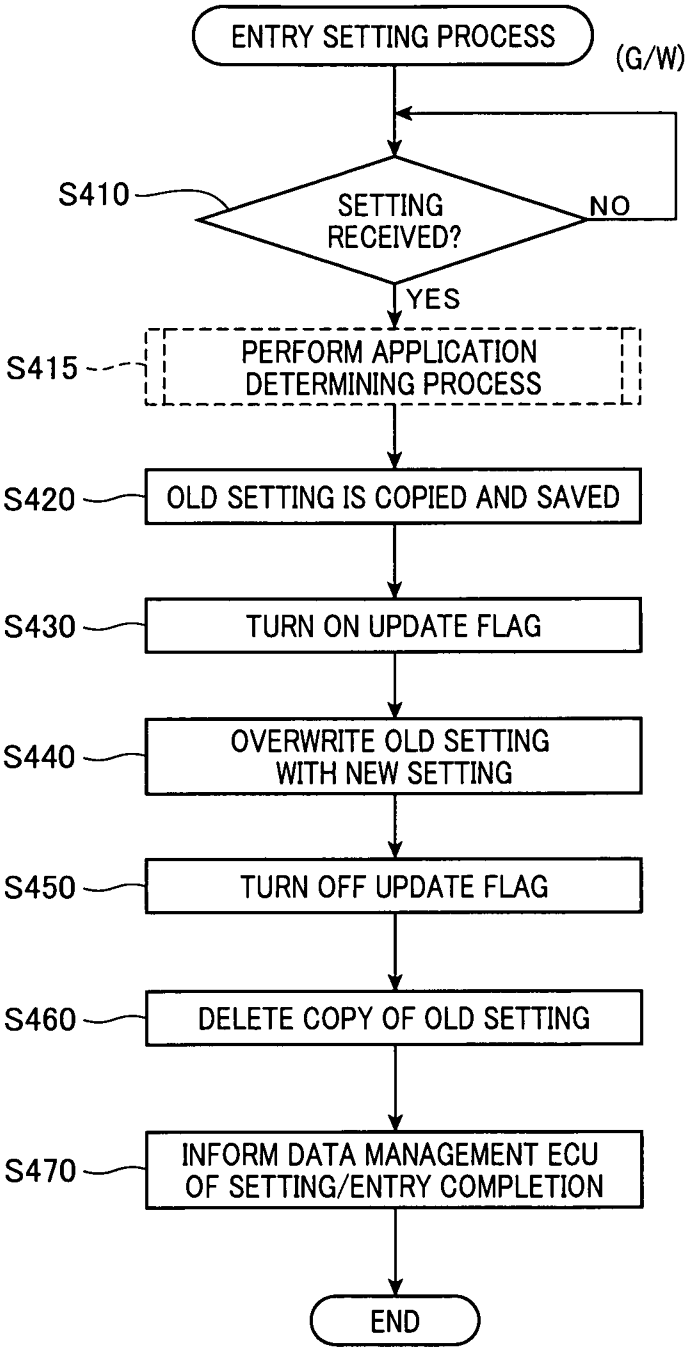
FIG. 5 is a flow diagram illustrating an entry setting process performed in the system.
Figure 6A:
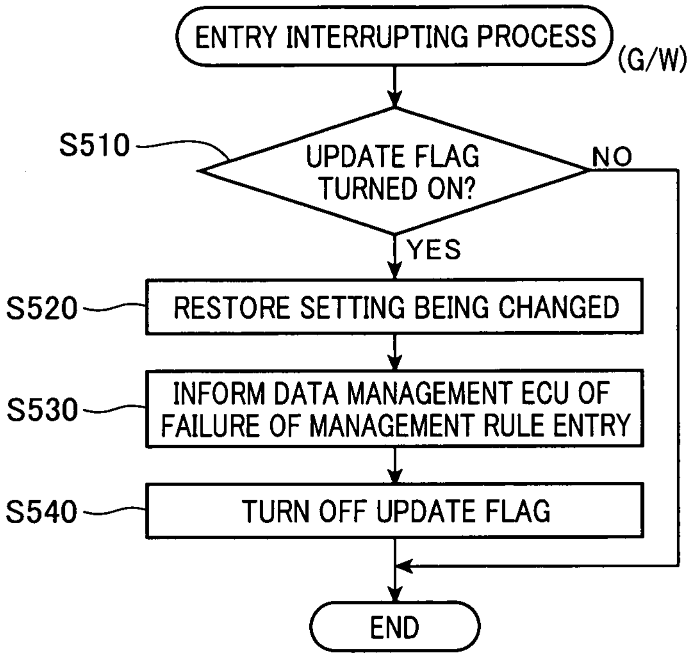
FIG. 6A is a flow diagram illustrating an entry interrupting process performed in the system.
Figure 6B:
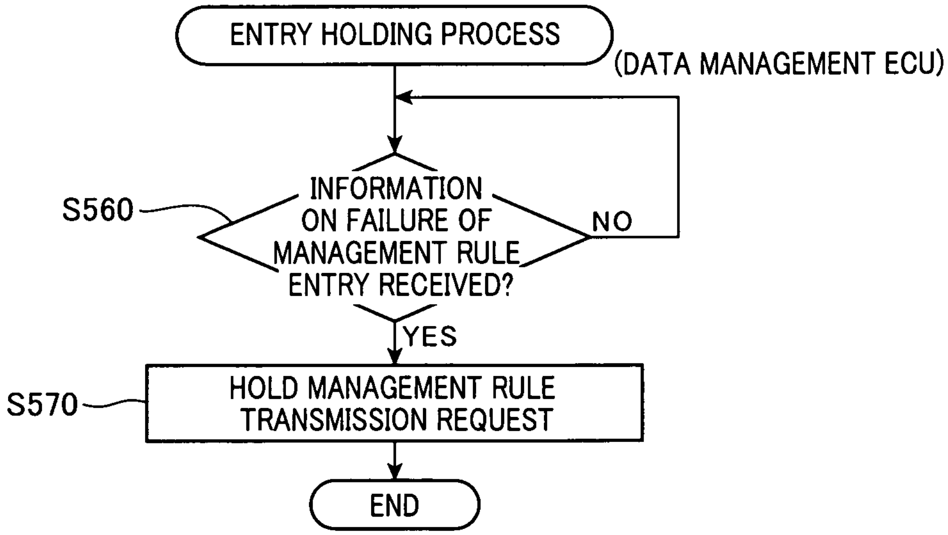
FIG. 6B is a flow diagram illustrating an entry holding process performed in the system.

FIG. 2 is a flow diagram illustrating an entry instructing process performed by the external device 20 based on the application 21. FIG. 4 is a flow diagram illustrating an entry relaying process performed by the data management ECU 10. FIG. 5 is a flow diagram illustrating an entry setting process performed by the gateway 40. FIG. 6A is a flow diagram illustrating an entry interrupting process performed by the gateway 40. FIG. 6B is a flow diagram illustrating an entry holding process performed by the data management ECU 10.

In setting/changing the type and the recording cycle of each piece of data recorded in the data management ECU 10, the external device 20 performs, first, the entry instructing process shown in FIG. 2. For example, the entry instructing process is started upon powering up of the external device 20 and repeatedly performed. In this process, the application 21 that uses data from the vehicle concerned is updated, first, in the external device 20. It is then determined whether or not the contents of the management rule 30 have been updated (changed) (S110). The management rule 30 is listed with information on data types that should be acquired from the vehicle and information on cycles with which data should be acquired in the vehicle.

Referring to FIGS. 3A and 3B, the contents of the management rule 30 are described. FIG. 3A is an explanatory view illustrating the management rule 30 which includes information on the management rule per se and information on data to be acquired.

The information on the management rule includes an ID for identifying the management rule, time and date of update at which the management rule has been updated in the external device 20, an ID for identifying the vehicle in which entry of the management rule is to be made, an ID for identifying the external device 20, and an ID for identifying the application activated on the external device 20.

The information on data to be acquired includes, for each of data types to be acquired, an ID for identifying the data type, a data acquisition cycle, a data acquisition method (storing data until a given level of volume is reached, or overwriting data each time data is acquired, etc.) and an acquisition range (specification of the temporal range, specification of the number of records, etc.).

For example, regarding a piece of data having an ID "0x0001" as indicated in FIG. 3B, when the acquisition method of this piece of data is "store", a determination is optionally made as to the maximum number of pieces of data ("5" in this example) of this type, as an "acquisition range", to be stored in the buffer 42 or the on-vehicle DB 13.

In the case of the piece of data having the ID "0x0001", pieces of data up to five are stored but when the number exceeds five, the oldest piece of data is overwritten. In other words, data is recorded based on a FIFO (first in first out) process.

In the case of a piece of data, such as a piece of data having an ID “0x0002”, with an acquisition method being set as “update”, the acquisition range is set to “1” so that only the latest information is always listed.

In the present embodiment, the acquisition method is set as “store” for those pieces of data, such as a signal based on a driver’s operation, which are unignorable and would otherwise cause inconvenience. Meanwhile, the acquisition method is set as “update” for those pieces of data, such as water temperature in the vehicle and vehicle speed, which would not cause inconvenience if only the latest data alone is acquired.

In FIG. 2, if the contents of the management rule 30 have not been updated (NO at S110), the entry instructing process is immediately ended. If the contents of the management role 30 have been updated (YES at S110), the updated management rule 30 is transmitted from the external device 20 to the data management ECU 10 (S120) to thereby end the entry instructing process.

Hereinafter is described the entry relaying process performed by the data management ECU 10 (controller 11). The entry relaying process is started when the data management ECU 10 is turned to an ON state or when communication is established between the data management ECU 10 and the external device 20. Then, the entry relaying process is repeatedly performed. As shown in FIG. 4, in the entry relaying process, it is determined, first, whether or not the management rule 30 has been received from the external device 20 (S210, rule acquiring means).

The management rule 30, if it has been received from the external device 20 (YES at S210), is entered into the on-vehicle DB 13 of the data management ECU 10 (S220). Then, it is determined whether or not the vehicle concerned is in a stopped or traveling status (S230: travel determining means; inhibiting means).

In performing this processing step, a signal from a vehicle speed sensor (not shown), which is connected to the control-system communication line 53 to sense the speed of the vehicle concerned, is received via the gateway 40 to make a determination based on the signal. The gateway 40 is configured to relay the signal from the vehicle sensor to the data management ECU 10.

If the vehicle is in a stopped status (YES at S230), the management rule 30 is transmitted to the gateway 40. Then, the data management ECU 10 allows the gateway 40 to perform an operation for updating the management rule 30 (operation for setting types of data to be acquired and cycles of acquiring the data) (S260: relaying/setting means, resuming means, management data transmitting means). This processing step includes another processing of setting. In another processing, the data management ECU 10 allows the gateway 40 connected thereto via the dedicated communication line 51 to relay type-specific data listed in the management rule 30 to the data management ECU 10 via the communication lines 52 and 53.

On the other hand, if the vehicle is in a traveling status (NO at S230), the processing step of transmitting the management rule 30 to the gateway 40 is buffered in the relay 12 (S240: inhibiting means). In other words, the data management ECU will not allow the gateway 40 to perform the operation for updating the management rule 30.

The determination regarding whether or not the vehicle concerned has stopped is repeatedly made (S250: stop monitoring means, resuming means). Specifically, when the vehicle concerned is not in a stopped status (NO at S250), the vehicle concerned is monitored as to whether or not it has stopped until it is finally stopped. At this processing step as well, the signal from the vehicle speed sensor is used as a basis for the determination, similar to the processing step of S230.

If the vehicle concerned is in a stopped status (YES at S250), the buffered processing step, i.e. the processing step for transmitting the management rule 30 to the gateway 40, is resumed. Thus, the management rule 30 is transmitted to the gateway 40 to allow the gateway 40 to perform the operation for updating the management rule 30 (S260). The gateway 40, when it has completed entry of data to the management rule 30 (management data 31), is ensured to inform the data management ECU 10 of the completion of entry (refer to S470 of the entry setting process shown in FIG. 5).

Thus, in the subsequent processing step, it is determined whether or not the information on completion of entry of data to the management rule 30 has been received from the gateway 40 within a predetermined time period (e.g. within three seconds) (S270 and S280). If the entry completion information has not been received within the predetermined time period (NO at S270 and YES at S280), the processing steps from S230 onwards are repeated to again allow the gateway 40 to set the management rule 30.

If the entry completion information has been received within the predetermined time period (YES at S270), the entry completion information is transmitted to the external device 20 (S290) to thereby end the entry relaying process.

At the processing step of S210, if the management rule 30 has not been received from the external device 20 (NO at S210), it is determined whether or not the processing step for transmitting the management rule 30 has already been buffered (S300). If the processing step for transmitting the management rule 30 has been buffered (YES at S300), control is transferred to S250 explained above. If the processing step for transmitting the management rule 30 has not been buffered (NO at S300), the entry relaying process is ended.

Referring now to FIG. 5, hereinafter is described the entry setting process performed by the gateway 40 (processor 41). For example, the entry setting process is started upon powering up of the gateway 40 and repeatedly performed.

In the entry setting process, as shown in FIG. 5, it is determined, first, whether or not the management rule 30 has been received from the data management ECU 10 (S410). The gateway 40 acquires the management rule 30 when transmitted from the data management ECU 10.

Figure 7:
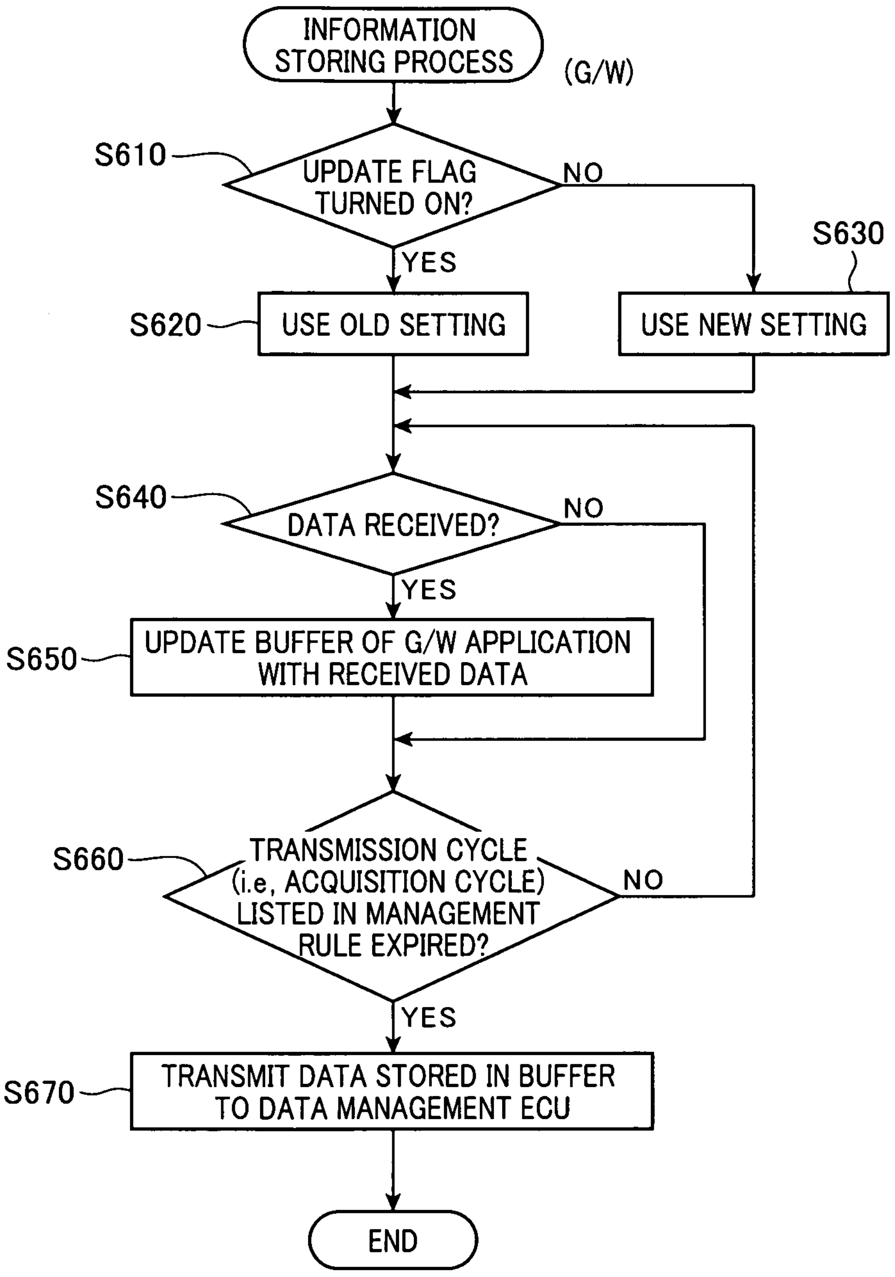
FIG. 7 is a flow diagram illustrating an information storing process performed in the system.

If the management rule 30 has not been received (NO at S410), the processing step of S410 is repeated until the management rule 30 is received. If the management rule 30 has been received (YES at S410), the contents of setting (hereinafter referred to as “set-up contents”) that have already been entered based on the management rule 30 (old set-up contents) are copied in the gateway 40 and the copied old set-up contents are saved in a memory (first set-up contents recorder, second set-up contents recorder), such as the buffer 42, of the gateway 40 (S420). In this case, the gateway 40 stores data with reference to the copied old set-up contents (refer to S610 and S620 of FIG. 7 illustrating the information storing process).

Subsequently, an update flag is turn to an ON state to indicate that the setting of the gateway 40 will be changed (S430: saving means). It should be appreciated that this flag is in an OFF state when the present process is started.

Then, the set-up contents based on the just received management rule 30 (new set-up contents) are stored as the management data 31 in a memory, such as the buffer 42, of the gateway 40 (S440: setting means, set-up contents storing means). Specifically, at this processing step, the management data 31 (old set-up contents) will be overwritten with the new set-up contents. However, the management data 31 (new set-up contents) is stored in a memory area which is different from the memory area where the old set-up contents have been saved, so that the old set-up contents will not be deleted.

The management data 31 here includes only the information corresponding to data to be acquired, that is, information excluding the information on the management rule 30 per se. In other words, the management data 31 only has to include the information on data types and data acquisition cycles of the data to be acquired so that the gateway 40 can sort data with reference to the information.

In the present embodiment, the data management EUC 10 records the management rule 30 as it is. However, if only the information on data types and data acquisition cycles is included, the information may be recorded as the management data 31 or as data with a different format.

Subsequently, the update flag is turned to an OFF state (S450) and the old set-up contents are deleted (S460). Then, information on the completion of entering the management rule is transmitted to the data management ECU 10 (S470) to thereby end the entry setting process.

Referring now to FIG. 6A, hereinafter is described the entry interrupting process performed by the gateway 40 (processor 41). In the entry interrupting process, when the vehicle concerned is started during the process of changing (entering) the set-up contents based on the management rule 30 as performed by the gateway 40, the processing step of the entry is interrupted.

Specifically, the gateway 40 constantly monitors whether or not the vehicle concerned has started movement, based on the results of detection of the vehicle speed sensor. Upon detection of the movement of the vehicle, the gateway 40 starts the entry interrupting process (travel determining means). In the entry interrupting process, the state of the update flag is judged first (S510, inhibiting means).

If the update flag is in an OFF state (NO at S510), the entry interrupting process is immediately ended. If the update flag is in an ON state (YES at S510), the setting in the process of being changed in the buffer 42 is restored (S520, inhibiting means). In other words, the gateway 40 carries out a processing step of inhibiting the entry setting process (FIG. 5) and of restoring the setting in the buffer 42 to the state before the entry setting process is performed.

Then, the gateway 40 transmits information on the failure of entering the management rule 30 to the data management ECU 10 (S530), turns the update flag to an OFF state (S540) and ends the entry interrupting process.

Referring to FIG. 6B, hereinafter is described the entry holding process performed by the data management ECU 10 (controller 11). The entry holding process is performed upon failure of the entry of the management rule 30 in the gateway 40 to buffer the processing step of transmitting the management rule 30 in the data management ECU 10, so as to be prepared for the entry of the management rule 30 again in the gateway 40.

For example, the entry holding process is started upon powering up of the data management ECU 10 and repeatedly performed. The entry holding process is performed in parallel with other processes, such as the entry relaying process.

Specifically, it is determined, first, whether or not the information on the failure of entering the management rule 30 has been received from the gateway 40 (S560).

If the entry failure information has not been received (NO at S560), the processing step of S560 is repeated. If the entry failure information has been received (YES at S560), the data management ECU 10 allows the processing step of transmitting the management rule 30 to be buffered in the relay 12 (S570) and ends the entry holding process.

Referring now to FIG. 7, hereinafter is described an information storing process performed by the gateway 40 (processor 41). In this process, the gateway 40 acquires/stores data from the ECUs 61 to 63, for example, configuring the on-vehicle network 50 and transmits the data to the data management ECU 10. FIG. 7 is a flow diagram illustrating the information storing process performed by the gateway 40. It should be appreciated that the processing steps at S640 to S670 correspond to the relay executing means of the present invention.

For example, the information storing process is started upon powering up of the gateway 40 and repeatedly performed. The information storing process is performed in parallel with other processes, such as the entry setting means. Specifically, in the information storing process, the state of the update flag is judged first (S610).

If the update flag is in an ON state (YES at S610), it is determined that data is to be stored with reference to the old set-up contents (management data 31) copied and saved in the buffer 42 (S620). If the update flag is in an OFF state (NO at S610), it is determined that data is to be stored with reference to the normal set-up contents (i.e., new set-up contents) instead of the old set-up contents copied and saved in the buffer 42 (S630).

Subsequently, it is determined whether or not data to be listed (stored) has been received from the on-vehicle network 50 (S640). For example, at this processing step, the type of each piece of received data is determined with reference to the data ID. Then, the gateway 40 compares the results of the determination with the set-up contents (management data 31) based on the management rule 30 and determines whether or not the data in question is to be listed.

If no data to be listed has been received (NO at S640), control proceeds to S660 which will be described later. If data to be listed has been received (YES at S640), the received data is recorded on the buffer 42 of the gateway 40 (S650). In this case, data management mode (e.g., the number of pieces of data stored) is changed according to the acquisition method (e.g., "store" or "update") which is based on the management data 31.

Then, it is determined, for each piece of data, whether or not the transmission cycle (i.e. acquisition cycle) listed in the management data 31 has expired (S660). If there are no pieces of data of which the transmission cycles (i.e. acquisition cycles) have expired (NO at S660), the processing steps from S640 onwards are repeated. If there are any pieces of data in the buffer 42, of which the transmission cycles (i.e. acquisition cycles) have expired, the pieces of data in question are transmitted to the data management ECU 10 (S670) to thereby end the information storing process.

On the other hand, the data management ECU 10 stores data in the on-vehicle DB 13 (data storing means), as it is received from the gateway 40. In the present embodiment, the data to be acquired by the data management ECU 10 is sorted by the gateway 40. Therefore, the data management ECU 10 only has to store the whole received data in the on-vehicle DB 13, whereby the data as listed in the management rule 30 is stored neither excessively nor insufficiently.

Figure 8:
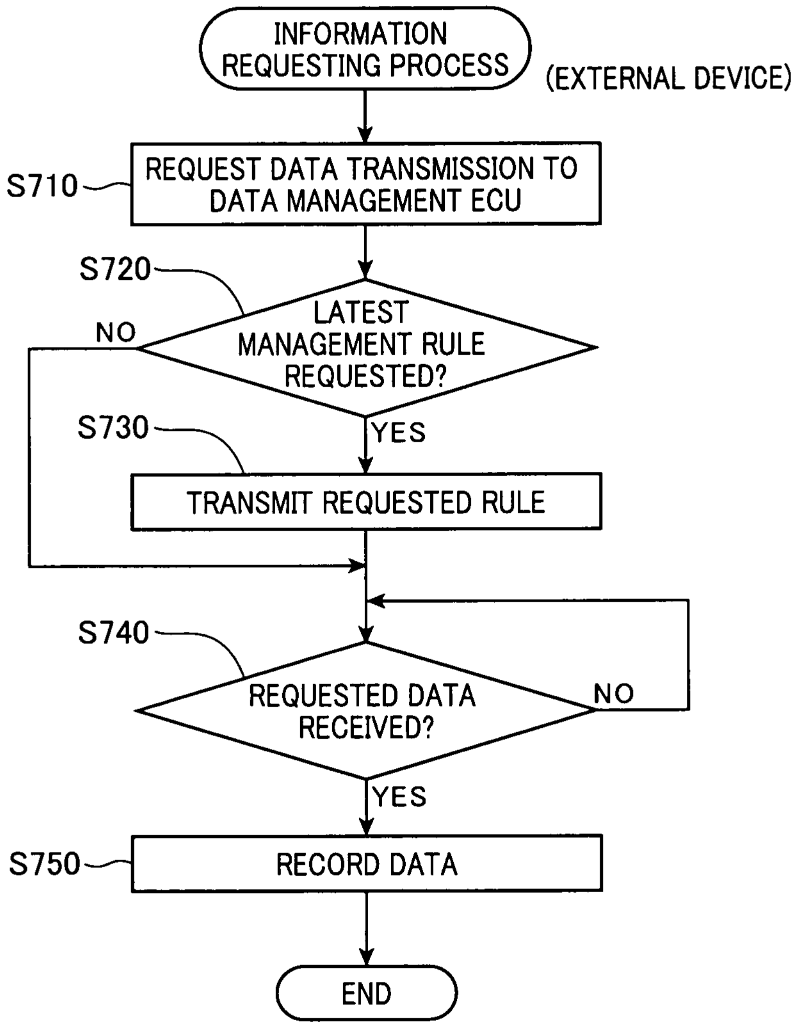
FIG. 8 is a flow diagram illustrating an information requesting process performed in the system.

Referring to FIG. 8, hereinafter is described an information requesting process. In the information requesting process, the external device 20 acquires data stored in the data management ECU 10. FIG. 8 is a flow diagram illustrating the information requesting process performed by the external device 20. For example, the information requesting process is started upon reception of an instruction from the application 21 installed in the external device 20. The information requesting process is performed in parallel with other processes, such as the entry instructing process.

Specifically, in the information requesting process, the external device 20 transmits, first, a data transmission request to the data management ECU 10 (S710). This transmission performed by the external 20 is accompanied by the latest information regarding the management rule 30 (e.g., information regarding the ID of the management rule 30, update time and date, etc.) Then, it is determined whether or not the data management ECU 10 has requested the latest management rule 30 (S720). This processing step is in concert with the request made at a processing step of S840 of an information transmitting process (FIG. 9), which will be described later, performed by the data management ECU 10.

If the latest management rule 30 has been requested (YES at S720), the requested management rule 30 is transmitted (S730) and then control proceeds to S740. If there is no request for the latest management rule 30 (NO at S720), control proceeds straight to S740.

Then, it is determined whether or not the data requested at S710 has been received (S740). If the requested data has not been received (NO at S740), the processing step of S740 is repeated until the data is received. If the requested data has been received (YES at S740), the external device 20 records the received data on the memory, such as RAM, of the external device 20 (S750) and ends the information requesting process.

Figure 9:
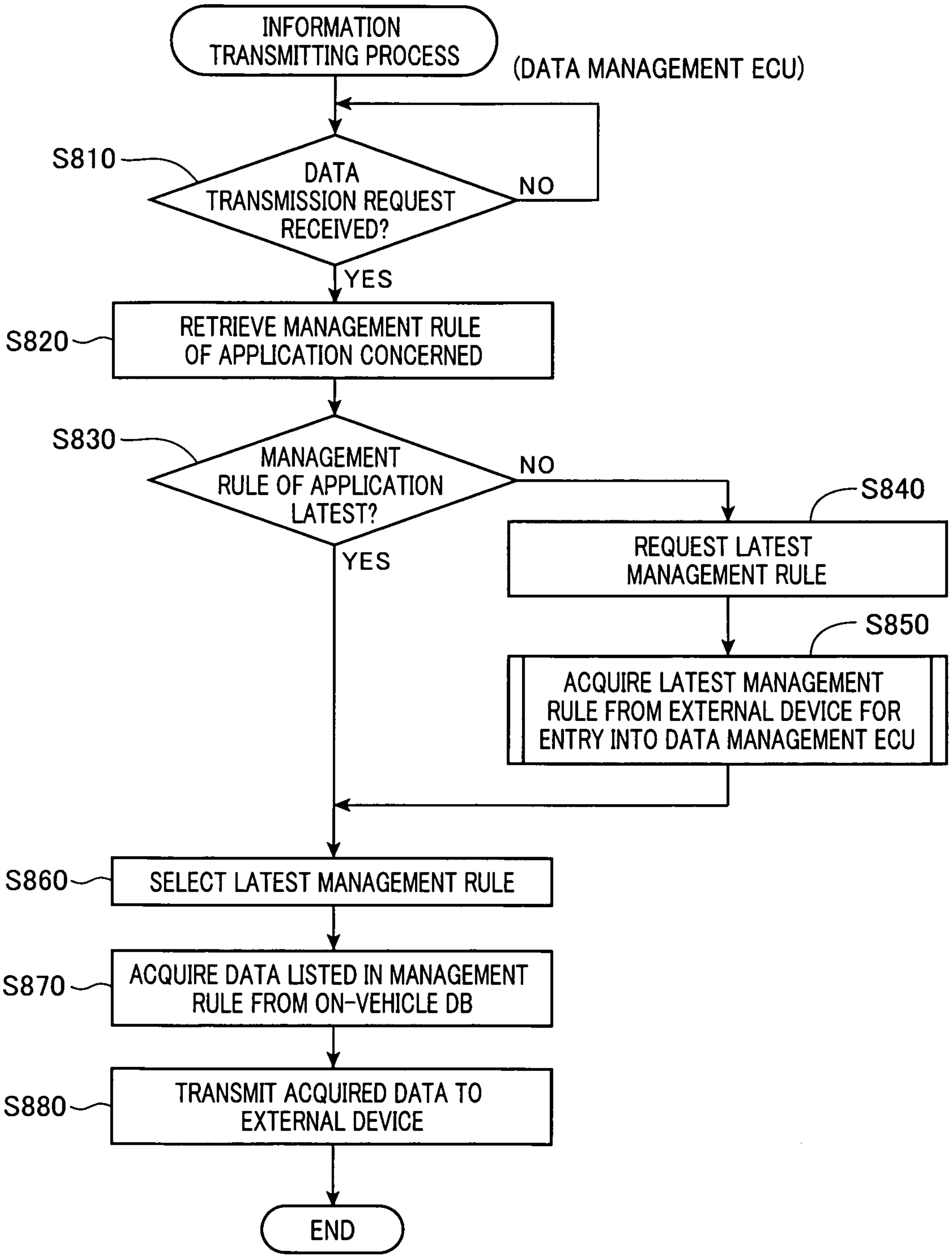
FIG. 9 is a flow diagram illustrating an information transmitting process performed in the system.

Referring now to FIG. 9, hereinafter is described an information transmitting process performed in response to the information requesting process. FIG. 9 is a flow diagram illustrating the information transmitting process performed by the data management ECU 10 (controller 11).

For example, the information transmitting process is started upon powering up of the data management ECU 10 or upon establishment of communication with the external device 20 and repeatedly performed. The information transmitting process is performed in parallel with other processes.

Specifically, as shown in FIG. 9, it is determined, first, whether or not a data transmission request has been received from the external device 20 (S810: transmission means). This processing step is in concert with the processing step of S710 of the information requesting process (FIG. 8).

If the data transmission request has not been received (NO at S810), the processing step of S810 is repeated until the data transmission request is received. If the data transmission request has been received (YES at S810), the data management ECU 10 retrieves the management rule 30 corresponding to the application 21 of the external device 20 (S820). Then, the data management ECU 10 compares the received information on the management rule 30, such as update time and date, with the information on the management rule 30, such as update time and date, that has been recorded in the data management ECU 10 per se to determine whether or not the management rule 30 is the latest one (S830).

If the management rule 30 is the latest one (YES at S830), control proceeds to the processing step of S860, which will be described later. If the management rule 30 is not the latest one (NO at S830), the data management ECU 10 transmits a request for transmitting the latest management rule 30 to the external device 20 (S840). After that, the data management ECU 10 acquires the latest management rule 30 from the external device 20 for entry into the data management ECU 10 (S850).

The processing step of S850 is performed, for example, by repeating the entry relaying process (FIG. 4) until the entry of the management rule 30 is completed. Upon completion of the entry of the management rule 30, the data management ECU 10 refers to the latest management rule 30 (S840: transmission means) and then acquires the data listed in the management rule 30 from the on-vehicle DB 13 (S870: transmission means). Then, the acquired data is transmitted to the external device 20 that is a request source (S880) to thereby end the information transmitting process.

Upon reception of the data resulting from the processing step of S880, the external device 20 performs the processing steps from S740 onwards of the information requesting process (FIG. 8).

In the data management system 1 as specifically described above, the data management ECU 10 acquires, in the entry relaying process, information on management rule 30 from outside the vehicle concerned, the information including data types and data acquisition cycles of the data to be acquired. Then, in the entry relaying process, the data management ECU 10 transmits the management data 31 out of the acquired management rule 30 to the gateway 40, the management data 31 indicating data that includes the information on data types and data acquisition cycles of the data to be acquired. After that, the data management ECU 10 acquires data from the gateway 40 and the acquired data is stored in the on-vehicle DB 13.

On the other hand, the gateway 40 is connected to the on-vehicle network 50 of the vehicle concerned. In the entry setting process, the gateway 40 acquires the management data 31 from the data management ECU 10 and refers to the management data 31 to set data types and data acquisition cycles of the data to be acquired. Then, in the information storing process, the gateway 40 acquires type-specific data as set in the entry setting process from the on-vehicle network 50 and relays each piece of acquired data to the data management ECU 10 at the set cycle.

According to the data management system 1 as described above, data management mode (at least either one of the information on data types of the data to be acquired and the information on data acquisition cycles of the data to be acquired) to be recorded on the on-vehicle DB 13 can be changed according to the data management mode included in the management rule 30 that has been acquired from outside the vehicle concerned. Accordingly, when the information required by the external device 20 has been changed, the corresponding data required by the external device 20 can be recorded in the vehicle concerned.

Further, in the data management system 1 described above, the gateway 40 determines whether or not the vehicle concerned is traveling (i.e. currently moving), and, if the vehicle is traveling, starts the entry interrupting process. In the entry interrupting process, the operation for setting data types and data acquisition cycles of the data to be acquired is inhibited.

According to the data management system 1 described above, the change based on the management rule 30 is prevented from being made while the vehicle concerned is in travel. Thus, control of the vehicle concerned in travel is prevented from being affected by the change of the data management mode.

Further, in the data management system 1 described above, the gateway 40 stores, in the entry interrupting process, the new set-up contents set at the entry setting process in the buffer 42 of the gateway 40. However, prior to storing the new set-up contents in the buffer 42 of the gateway 40, the gateway 40 saves a copy of the old set-up contents, which have been stored in the buffer 42, in a different memory area of the buffer 42.

Then, in the information storing process, only if the new set-up contents are in the process of being stored in the buffer 42 after the acquisition of the management data 31 (i.e. during the period when the update flag is in an ON state), the gateway 40 relays data based on the copy of the old set-up contents (management data 31) saved in the buffer 42 of the gateway 40). Otherwise, the gateway 40 relays data based on the new set-up contents, not based on the copy of the old set-up contents saved in the buffer 42 of the gateway 40.

According to the data management ECU 10, data can be continuously stored using the saved management data 31 before being changed (old set-up contents), under the condition where the updating processing of the management data 31 is inhibited.

Also, in the data management system 1, the data management ECU 10 allows the gateway 40 connected thereto via the dedicated communication line 51 to relay type-specific data that has been set in the entry relaying process.

According to the data management ECU 10, the gateway 40 is set so that the gateway 40 can relay the type-specific data required by the data management ECU 10, under the condition where the gateway 40 is provided on the on-vehicle network 50.

Further, the data management EUC 10 allows the gateway 40 to set a data acquisition cycle for each of data types set in the entry relaying process.

According to the data management ECU 10, data acquisition cycles are also set in the gateway 40.

In addition, the data management ECU 10 is connected to the gateway 40 via the dedicated communication line 51.

Thus, according to the data management ECU 10, the data types and data acquisition cycles which should be acquired by the data management ECU 10 can be managed by the gateway 40. Accordingly, the data management ECU 10 is not required to have a function of sorting data and therefore the configuration of the data management ECU 10 is simplified.

Also, in the data management ECU 10, it is determined in the entry relay process whether or not the vehicle concerned is traveling. If the vehicle is traveling, the data management ECU 10 allows the gateway 40 to inhibit the operation for setting data types and data acquisition cycles of the data to be acquired.

According to the data management ECU 10, the change based on the management rule 30 is prevented from being made while the vehicle is traveling. Thus, control of the vehicle concerned while traveling is prevented from being affected by the change of the data management mode.

Further, when the operation of the gateway 40 is inhibited, the data management ECU 10 monitors thereafter whether or not the vehicle concerned has been stopped. Then, when the vehicle has been stopped, the inhibited operation is resumed.

According to the data management ECU 10, the inhibited operation is resumed when the vehicle concerned has been stopped. Thus, the management rule 30 acquired from outside the vehicle is prevented from being ignored.

Further, upon reception of a data transmission request from the external device 20, the data management ECU 10 transmits the data recorded on the on-vehicle DB 13 to the external device 20 that is a request source.

According to the data management ECU 10, requested data is transmitted to the external device 20.

In the data management ECU 10, the management rule 30 is set up with information on the number of pieces of data to be stored in the buffer 42 for each of data types. If the number of pieces of data to be stored in the buffer 42 exceeds the number based on the information on the number of pieces of data, the oldest piece of data is overwritten for storage in the buffer 42.

According to the data management ECU 10, only acquiring the management rule 30 enables setting/change of the number of pieces of data to be stored in the buffer 42 for each of data types. As a result, the number of pieces of data to be stored in the buffer 42 is set to an appropriate number for each of data types, thereby saving the storage capacity of the buffer 42. This is particularly significant in the present embodiment because storage capacity is saved in a vehicle having strict limitations on the capacity of memories, such as the buffer 42 and the on-vehicle DB 13.

The communication speed between the external device 20 and the data management ECU 10 may be slower than that between the data management ECU 10 and the gateway 40. In such a case, the data management ECU 10 is required to temporarily retain a large amount of data when transmitting data to the external device 20. In this regard, the embodiment described above is configured such that the number of pieces of data to be stored in the buffer 42 is set to an appropriate number for each of data types. Thus, the number of pieces of data temporarily retained by the data management ECU 10 is prevented from being excessively increased.

Therefore, the data management system 1 of the present embodiment can be formulated under the condition where the communication speed between the external device 20 and the data management ECU 10 is minimized.

[Modifications]

The present invention is not limited to the embodiment described above but may be variously modified as follows without departing from the spirit of the present invention. In the following modifications, the components identical with or similar to those in the embodiment described above are given the same reference numerals for the sake of omitting explanation.

The embodiment described above has been configured such that the data management ECU 10 receives data from the on-vehicle network 50 via the gateway 40. Alternatively to this, however, the data management ECU 10 may be configured, for example, to receive data straight from the on-vehicle network 50 using the communication lines 52 and 53. In this case, the data management ECU 10 can perform the entry setting process (excepting the processing step of S410) in the entry relaying process, replacing the processing steps of S260 to S280. Then, the data management ECU 10 can perform the information storing process, with the replacement of the processing step of S670 by the processing step of storing data.

Specifically, the data management ECU 10 may acquire the management rule 30 from outside the vehicle concerned, the management rule 30 including at least either one of the information on data types of the data to be acquired or the information on data acquisition cycles of the data to be acquired (S210). Then, the data management ECU 10 may set data types and data acquisition cycles of the data to be acquired with reference to the management rule 30 (modification: S440). After that, the data management ECU 10 can acquire each piece of given type-specific data at the set cycle for storage in the on-vehicle DB 13 (modification: S670).

According to the data management ECU 10 described above, data management mode (at least either one of the information on data types of the data to be acquired and the information on data acquisition cycles of the data to be acquired) to be recorded on the on-vehicle DB 13 can be changed according to the data management mode included in the management rule 30 that has been acquired from outside the vehicle concerned. Thus, when the information required by the external device 20 has been changed, the corresponding data required by the external device 20 can be recorded in the vehicle concerned.

In this modification, the on-vehicle DB 13 corresponds to the first set-up contents recorder and the second se-up contents recording means.

Figure 10:
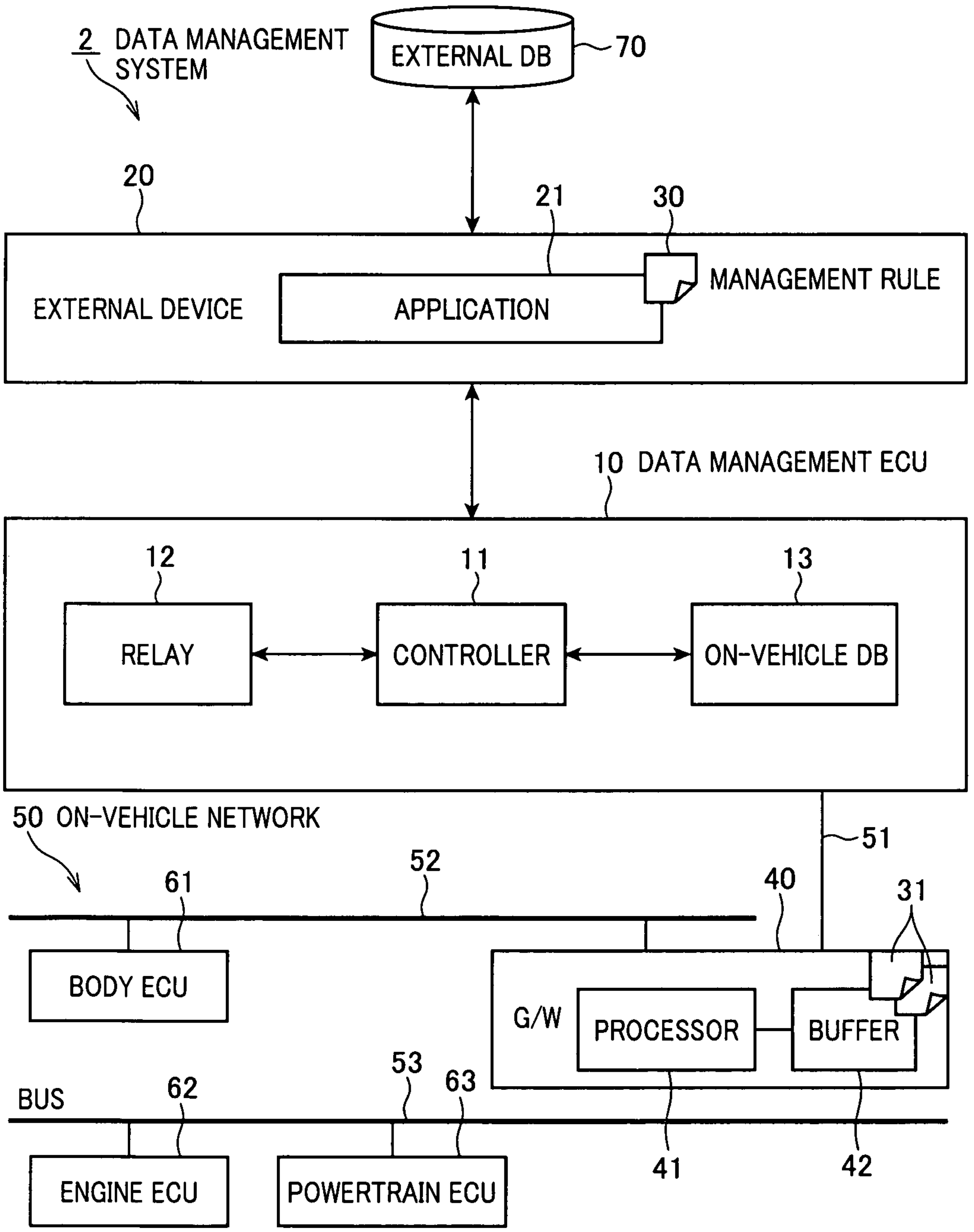
FIG. 10 is a schematic block diagram illustrating a configuration of a modification of the data management system.

In the embodiment described above, the external device 20 has been configured to store data acquired from the data management ECU 10 in the external device 20 per se. Alternative to this, however, the data management system 1 may be configured as shown in FIG. 10. FIG. 10 is a schematic block diagram illustrating a configuration of a data management system 2, a modification of the data management system 1. As shown in the data management system 2 of FIG. 10, a data management system may be provided with an external data base (DB) 70 capable of communicating with the external device 20 so that the external device 20 can record received data on the external DB 70. With this configuration as well, advantages similar to those of the above embodiment can be enjoyed.

In the above modification, the data acquisition methods (see FIG. 3) in the on-vehicle DB 13 can be changed according to the management rule 30 and therefore the storage capacity of the on-vehicle DB 13 can be used more efficiently.

Figure 11:
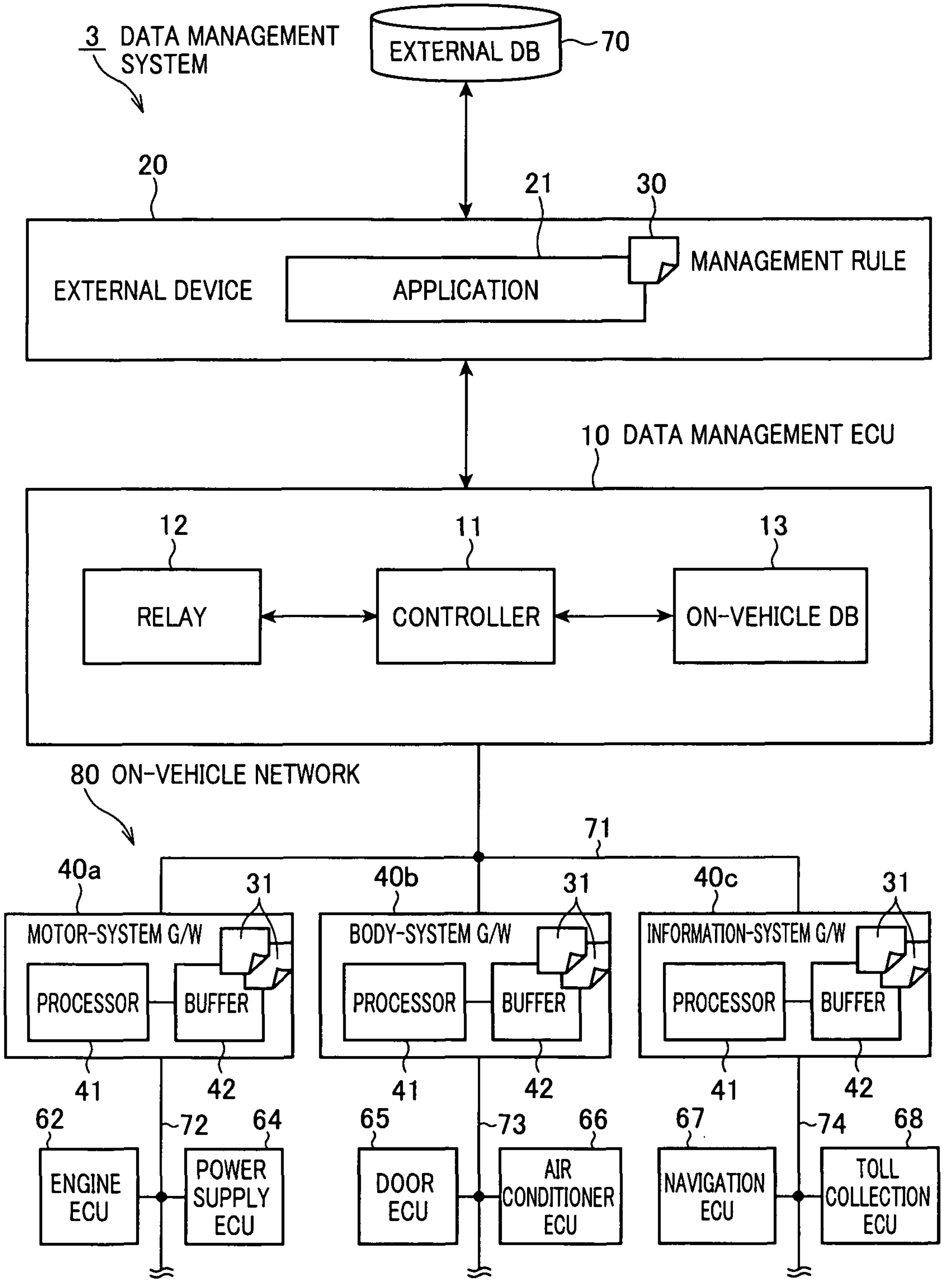
FIG. 11 is a schematic block diagram illustrating a configuration of another modification of the data management system.

The data management system 1 may be modified as shown in FIG. 11. FIG. 11 is a schematic block diagram illustrating a configuration of a data management system 3, a modification of the data management system 1. As shown in the data management system 3 of FIG. 11, the data management ECU 10 may be connected to an on-vehicle network 80 which is different from the on-vehicle network 50. For example, the data management ECU 10 may be connected, in the on-vehicle network 80, to a communication line 71 capable of comparatively high speed communication, such as CAN. In this case, the communication line 71 may be provided with a plurality of gateways 40*a* to 40*c* each of which is capable of performing the processing steps similar to those of the gateway 40 described above.

The gateway 40*a* for motor system (hereinafter referred to as "motor-system gateway 40*a*) is also connected to a motor-system communication line 72 and provided with the processor 41 and the buffer 42 similar to those of the gateway 40. Further, the motor-system gateway 40*a* is also connected such as to an engine ECU 62 and a power supply ECU 64 that controls battery voltage and the like, via the motor-system communication line 72.

The gateway 40*b* for body system (hereinafter referred to as "body-system gateway 40*b*") is also connected to a body-system communication line 73 and provided with the processor 41 and the buffer 42 similar to those of the gateway 40. Further, the body-system gateway 40*b* is also connected such as to a door ECU 65 that controls opening/closing of the vehicle doors and an air conditioner ECU 66 that conditions air in the vehicle cabin, via the body-system communication line 73.

The gateway 40*c* for information system (hereinafter referred to as "information-system gateway 40*c*") is also connected to an information-system communication line 74 and provided with the processor 41 and the buffer 42 similar to those of the gateway 40. Further, the information-system gateway 40*c* is also connected such as to a navigation ECU 67 having a function as a navigation system and toll collection ECU 68 having a function of automatically collecting tolls, via the information-system communication line 74.

The gateways 40*a* to 40*c* relay data transmitted through the communication lines 71 to 74, respectively, to the data management ECU 10 while buffering the data therein according to the management data 31.

In the data management system 3 as configured above, the data management ECU 10 broadcasts the management data 31 to each of the gateways 40*a* to 40*c*. Then, the gateways 40*a* to 40*c* each determine whether or not information required for itself is included in the management data 31 and update the management data 31 as required. This will be specifically described referring to FIGS. 12 and 13.

Figures 12, 13:
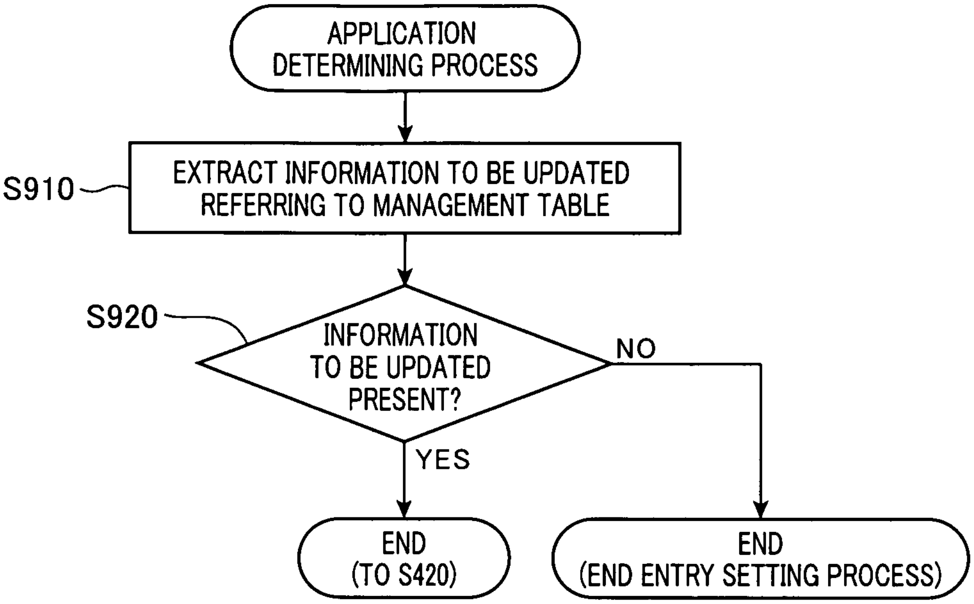
FIG. 12 is a flow diagram illustrating an application determining process.
FIG. 13 is an explanatory diagram illustrating a management table.

FIG. 12 is a flow diagram illustrating an application determining process in the entry setting process performed by the gateways 40*a* to 40*c*. FIG. 13 is an explanatory diagram illustrating a management table that indicates data types managed by each of the gateways 40*a* to 40*c*.

The gateways 40*a* to 40*c* of the data management system 3 perform the application determining process (S415) between the processing steps of S410 and S420 of the entry setting process (refer to FIG. 5). As shown in FIG. 12, in the application determining process, each of the gateways 40*a* to 40*c* extracts the information that should be updated from the management data 31, with reference to the management table possessed by the gateway per se (S910).

In the data management system 3, the communication line 71 is connected to the data management ECU 10 and located at a higher-order position of the gateways 40*a* to 40*c*. Meanwhile, the communication lines 72 to 74 (which are different from the communication line 71) are connected to the ECUs different from the data management ECU 10 and located at lower-order positions of the gateways 40*a* to 40*c*, respectively.

As shown in FIG. 13, the management table of each of the gateways 40*a* to 40*c* is configured such that data IDs which are used for the communication line 71 are correlated to respective data IDs (managed by the gateway per se concerned) which are used for each of the communication lines 72 to 74. For example, as shown in FIG. 13, there are two data IDs for the lower-order communication line which are managed by the gateway concerned, i.e. "0x1A" and "0x13", which are correlated to the data IDs "0x0001" and "0x003", respectively, for the higher-order communication line.

On the other hand, none of data IDs managed by the gateway per se concerned is correlated to data IDs "0x002" or "0x0004". This means that data corresponding to data IDs "0x002" and "0x0004" is not used (or not required to be relayed by the gateway per se concerned) in the lower-order communication line (e.g., communication line 72 in the case of the motor-system gateway 40*a*).

Accordingly, in the present processing step, it is determined whether or not the data to be acquired included in the management data 31 is the data to be used by the gateway per se concerned. In making this determination, the management table is sequentially searched through from the beginning, for example, to detect whether or not a matched data ID is correlated to a data ID managed by the gateway per se concerned to thereby extract data to be updated.

In the example shown in FIG. 13, if the data to be acquired, which is included in the management data 31, includes "0x0001" to "0x0004", two data IDs, i.e. "0x0001 (0x1A)" and "0x0003 (0x13)" will be extracted as information to be updated. It should be appreciated that the management table is rendered to be different between data types dealt by the gateways 40*a* to 40*c*.

When this processing step as explained above has been ended, it is determine whether or not the received management data includes information to be updated (S920: need determining means). The presence/absence of information to be updated is determined by whether or not information to be updated has been extracted.

If information to be updated is included (YES at S920), the application determining process is ended and then the processing steps from S420 onwards as described above are performed. If information to be updated is not included (NO at S920), the application determining process is ended, and the entry setting process is also ended.

In the data management system 3 configured as described above, the gateways 40*a* to 40*c* determine whether or not the management data 31 is the data required by the gateways 40*a* to 40*c*. In making this determination, the gateways 40*a* to 40*c* check the respective management tables (data lists), in which the data dealt by the gateways is listed, against the data included in the management data 31. Then, only when the management data 31 is the data required by the gateways 40*a* to 40*c*, setting is performed referring to the management data 31.

According to the data management system 3 configured as described above, the data management ECU 10 only has to transmit the same data, i.e. the management data 31, to the plurality of gateways 40*a* to 40*c*. Upon reception of the management data 31, the gateways 40*a* to 40*c* can determine the need of the management data 31 and change the setting. Thus, the data management ECU 10 does not have to perform such management as analyzing data to be dealt by the gateways 40*a* to 40*c*, whereby the configuration of the data management ECU 10 can be simplified.

For the sake of completeness, it should be mentioned that the various embodiments explained so far are not definitive lists of possible embodiments. The expert will appreciates that it is possible to combine the various construction details or to supplement or modify them by measures known from the prior art without departing from the basic inventive principle.

What is claimed is:

1. An apparatus for managing data processed in a vehicle, the apparatus comprising:

a processor including:

a rule acquiring unit acquiring, from outside the vehicle, a management rule including at least one of information indicating a type of data acquired by an external device placed outside the vehicle and information indicating an acquisition cycle at which the data should be acquired;

a rule setting unit setting, in the apparatus, at least one of the type of data and the acquisition cycle by making reference to the management rule in response to acquisition by the rule acquiring unit;

a data acquiring unit acquiring data which is according to at least of one of the type of data and the acquisition cycle set by the rule setting unit;

a data recorder;

a data storing unit for storing in the data recorder the data acquired by data acquiring unit;

a travel determining unit determining whether or not the vehicle is traveling at present;

an inhibiting unit inhibiting the rule setting unit from setting at least one of the type of data and the acquisition cycle when the travel determining unit determines that the vehicle is traveling at present;

a stop monitoring unit monitoring that the vehicle has stopped moving after the inhibiting unit inhibits the rule setting unit from setting at least one of the type of data and the acquisition cycle; and a resuming unit resuming the rule setting unit by releasing the inhibition of the setting of at least one of the type of data and the acquisition cycle.

2. The apparatus of claim 1, further comprising a transmission unit transmitting data to the external device when the external device requests the apparatus to transmit the data.

3. The apparatus of claim 2, wherein the apparatus is communicably connected to a gateway via a communication line, the gateway operating on changeable relay states, the management rule includes the information indicating the type of data to be acquired, and the rule setting unit is configured to set the type of data to be acquired, by making reference to the management rule, the apparatus further comprising a relay state setting unit allowing the gateway to be set such that the gateway relays, from the external device, the data whose type is set by the rule setting unit.

4. The apparatus of claim 3, wherein the management rule further includes information indicating the number of data to be stored into the data recorder, the information indicating the number of data being associated with each of the data to be stored in the data recorder, the data storing unit includes a determining unit determining whether or not the number of data to be stored in the data recorder is larger than a number decided by the information indicating the number of data, and an overwriting unit overwriting the new data to be stored, on the oldest data stored in the data recorder, in cases where it is determined that the number of data to be stored is larger than the number decided by the information.

5. The apparatus of claim 3, wherein the management rule also includes the information indicating the acquisition cycle, and the rule setting unit is configured to also set the acquisition cycle by making reference to the management rule, the relay state setting unit is configured to allow the gateway to be set such that the gateway relays, from the external device, the data at the acquisition cycle set by the rule setting unit, the data having the type set by the rule setting unit.

6. The apparatus of claim 5, wherein the communication line is a dedicated communication line for data, wherein the dedicated communication line is connected to only the gateway.

7. The apparatus of claim 2, wherein the management rule further includes information indicating the number of data to be stored into the data recorder, the information indicating the number of data being associated with each of the data to be stored in the data recorder, the data storing unit includes a determining unit determining whether or not the number of data to be stored in the data recorder is larger than a number decided by the information indicating the number of data, and an overwriting unit overwriting the new data to be stored, on the oldest data stored in the data recorder, in cases where it is determined that the number of data to be stored is larger than the number decided by the information.

8. The apparatus of claim 1, further comprising a first set-up contents recorder and a second set-up contents recorder in both of which contents set by the rule setting unit are stored;

a set-up contents storing unit for storing the contents set by the rule setting unit, into the first set-up contents recorder; and a saving unit for saving the contents stored in the first set-up contents recorder into the second set-up contents recorder before the set-up contents recording unit sets up the contents into the first set-up contents recorder, wherein the data storing unit is configured to i) store the data into the data recorder in accordance with the set-up contents stored in the second set-up contents recorder only during a designated period starting from a timing at which the management rule is acquired by the rule acquiring unit to a timing at which the set-up contents is stored into the first set-up contents recorder by the set-up contents storing unit and ii) store the data into the data recorder in accordance with the set-up contents stored in the first set-up contents recorder during periods other than the designated period.

9. The apparatus of claim 1, further comprising a first set-up contents recorder and a second set-up contents recorder in both of which contents set by the rule setting unit are stored;

a set-up contents storing unit storing the contents set by the rule setting unit, into the first set-up contents recorder; and a saving unit saving the contents stored in the first set-up contents recorder into the second set-up contents recorder before the set-up contents recording unit sets up the contents into the first set-up contents recorder, wherein the data storing unit is configured to i) store the data into the data recorder in accordance with the set-up contents stored in the second set-up contents recorder only during a designated period starting from a timing at which the management rule is acquired by the rule acquiring unit to a timing at which the set-up contents is stored into the first set-up contents recorder by the set-up contents storing unit and ii) store the data into the data recorder in accordance with the set-up contents stored in the first set-up contents recorder during periods other than the designated period.

10. A system comprising a data management apparatus for managing data processed in a vehicle having an on-vehicle network and a gateway communicably connected to the data management apparatus via a communication line, wherein the data management apparatus comprises:

a processing unit including:

a rule acquiring unit acquiring, from outside the vehicle, a management rule including at least one of information indicating a type of data acquired by an external device placed outside the vehicle and information indicating an acquisition cycle at which the data should be acquired;

a management data transmitting unit transmitting to the gateway management data indicating at least one of the information indicating the type of data acquired or the information indicating the acquisition cycle of the data;

a data storing unit acquiring data from the gateway and storing the acquired data in a data recorder, and wherein the gateway is communicably connected to the on-vehicle network, and the gateway comprises:

an acquiring unit acquiring the management data from the data management apparatus;

a type and cycle setting unit setting at least one of the type of data to be acquired and the acquisition cycle of the data by making reference to the management data;

an acquiring unit acquiring from the on-vehicle network the data whose type is set by the type and cycle setting unit or acquiring from the on-vehicle network the data of a predetermined type at the cycle set by the type and cycle setting unit; and a relay executing unit relaying the acquired data to the data management apparatus;

a travel determining unit determining whether or not the vehicle is traveling at present;

an inhibiting unit inhibiting the rule setting unit from setting at least one of the type of data and the acquisition cycle when the travel determining unit determines that the vehicle is traveling at present;

a stop monitoring unit monitoring that the vehicle has stopped moving after the inhibiting unit inhibits the rule setting unit from setting at least one of the type of data and the acquisition cycle; and a resuming unit resuming the rule setting unit by releasing the inhibition of the setting of at least one of the type of data and the acquisition cycle.

11. The system of claim 10, wherein the gateway further comprises:

a first set-up contents recorder and a second set-up contents recorder in both of which contents set by the rule setting unit are stored;

a set-up contents storing unit storing the contents set by the rule setting unit, into the first set-up contents recorder; and a saving unit saving the contents stored in the first set-up contents recorder into the second set-up contents recorder before the set-up contents recording unit sets up the contents into the first set-up contents recorder, wherein the relay executing unit is configured to i) store the data into the data recorder in accordance with the set-up contents stored in the second set-up contents recorder only during a designated period starting from a timing at which the management data is acquired to a timing at which the set-up contents is stored into the first set-up contents recorder and ii) store the data into the data recorder in accordance with the set-up contents stored in the first set-up contents recorder during periods other than the designated period.

12. The system of claim 10, wherein the gateway is composed of a plurality of gateways each being communicably connected to the data management apparatus and each comprising the type and cycle setting unit and the relay executing unit, wherein the management data transmitting unit is configured to transmit the management data to the respective gateways, and wherein each of the gateways comprises a need determining unit for determining whether or not the management data is needed by the gateway receiving the management data, by making comparison between a data list in which data to be processed by the gateway are previously recorded and data included in the management data, wherein the type and cycle setting unit is configured to set the type of the data or the acquisition cycle of the data only when it is determined that the management data is needed by the gateway receiving the management data.

* * * * *